Patented Apr. 26, 1932

1,855,788

UNITED STATES PATENT OFFICE

CLAYTON W. BEDFORD, OF AKRON, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing. Application filed September 11, 1928. Serial No. 305,322.

This invention relates to the art of preserving rubber, either in a vulcanized or unvulcanized condition, and to rubber compositions so preserved.

It is well known that rubber deteriorates in strength, elasticity, and other desirable properties when it is exposed to heat, light, or air. Substances known as "antioxidants" or "age-resisters" have been incorporated into rubber for the purpose of retarding its deterioration. Among such age-resisters which have been employed with more or less success may be mentioned the aromatic amines, especially secondary aromatic amines, poly-hydroxy benzenes, amino-phenols, and the reaction products of primary aromatic amines with alkyl chlorides or aldehydes. Many of these age-resisters have the disadvantage of accelerating the vulcanization of rubber to such a degree that it becomes necessary to reduce the proportion of sulphur or accelerator or to reduce the time of vulcanization of a composition into which they are incorporated. The object of this invention is to provide a new class of non-accelerating age-resisters.

This invention in brief consists in treating rubber with the non-accelerating condensation product of two or more mols of an aldehyde with one mol of a primary aromatic amine. Such condensation products may be produced by the reaction of an aldehyde, preferably an aliphatic aldehyde such as acetaldehyde, aldol, butyraldehyde, heptaldehyde, etc. with a primary aromatic amine such as aniline, the toluidines, the xylidines, the naphthylamines, p-amino-dimethylaniline, p-amino-diphenylamine, diamino-diphenyl-methane, etc. The reaction is preferably carried out by mixing the two substances, or if they are solid, melting and mixing them, either without or preferably in the presence of a small amount of an acid as a catalyst. The mixture is slowly heated to a temperature high enough to eliminate the water formed during the reaction.

The acids which are employed as catalysts are preferably the ordinary strong non-oxidizing mineral acids such as hydrochloric or sulphuric acids or the moderately strong fatty acids such as acetic acid. Sufficient acid is often naturally present in the aldehyde as a result of its oxidation to the corresponding fatty acid. Strong oxidizing acids such as nitric acid are to be avoided.

As a specific example of one embodiment of the method of this invention, condensation products were prepared as follows: Aldol and alpha-naphthylamine were weighed out in the following proportions, to make four different products from different proportions of the aldehyde and the amine.

|   | Parts by weights | | Molecular ratio |
|---|---|---|---|
|   | Aldol | α-naph-thyl-amine | |
| A | 176 | 143 | 2 to 1 |
| B | 264 | 143 | 3 to 1 |
| C | 352 | 143 | 4 to 1 |
| D | 440 | 143 | 5 to 1 |

In each case the aldol was dissolved in the molten alpha-naphthylamine and the mixture was heated to 250° F. for two hours. The products, when cool were soft, amber-colored resins.

A typical tire tread composition was prepared containing blended plantation rubbers 100 parts by weight, sulphur 5.5 parts, zinc oxide 30 parts, gas black 40 parts, mineral rubber 10 parts, palm oil 5 parts, and hexamethylene tetramine 0.75 parts. The composition was divided into five parts, one of which was used as a control. To each of the others was added 0.95 parts (0.5% of the composition) of one of the products A, B, C, and D. The compositions were thoroughly mixed and vulcanized in a press for 45 minutes at 294° F. to produce an optimum cure. The vulcanized compositions were tested to compare their relative rates of aging. The accelerated aging was carried out by suspending the samples in the Geer aging oven, in which they were maintained at a temperature of 158° F. in a constantly renewed stream of air. In the following table T. S. represents the ultimate tensile strength in lbs. per sq. in. and El. represents the ultimate elongation in percent. of the original length:

*Aging tests*

| Age-resister | Before aging | | After aging in the Geer oven | | | | | |
|---|---|---|---|---|---|---|---|---|
| | | | 2 days | | 4 days | | 7 days | |
| | T. S. | El. | T. S. | El. | T. S. | El. | T. S. | El. |
| None | 3943 | 663 | 3029 | 554 | 2106 | 467 | 1398 | 313 |
| A | 4023 | 675 | 3506 | 600 | 3106 | 558 | 2551 | 483 |
| B | 3953 | 654 | 3162 | 558 | 2486 | 492 | 2321 | 438 |
| C | 3992 | 675 | 3289 | 567 | 2688 | 508 | 2253 | 442 |
| D | 4049 | 663 | 3027 | 575 | 2449 | 483 | 2183 | 433 |

From these results it is evident that the non-accelerating condensation products of two or more mols of an aldehyde with one mol of a primary aromatic amine are extremely effective in retarding the deterioration of rubber, and that rubber treated with such products may be preserved for much longer periods than similar untreated rubber, without sensible deterioration. These condensation products may also be applied to unvulcanized or vulcanized rubber with good effect on the age-resisting properties of the rubber, such as by applying them to the surface of the rubber, as for example in solution, or in the form of a paste or emulsion.

It is to be understood that the particular rubber composition herein specified is merely illustrative, and that the proportions of the ingredients may be changed as desired, or compositions of an entirely different character may profitably be treated with the age-resisters of the class hereinabove defined.

The products of this invention are preferably prepared from aldehydes and amines of fairly high molecular weight, since it has been found, for example, that butyraldehyde gives better products than acetaldehyde, toluidine better than aniline, and the naphthylamines, still better. They may be prepared by other methods than that shown in the examples, for instance, the aldehyde and the amine, or a salt of the amine, may be dissolved or emulsified in water and the product thus precipitated from solution, neutralized, filtered, washed, and dried. However, the method of preparing the products forms no part of this invention, and they may be prepared by any convenient method which will give the desired product; namely, a condensation product which is substantially a non-accelerator of vulcanization. It is well known that nitrogenous materials having a basic reaction, such as amines, amides, hydrazines, etc., although not themselves endowed with marked accelerating properties, possess the property of activating certain commercial accelerators, especially sulphur-containing accelerators. Therefore I do not intend to limit my definition of non-accelerating products to include only substances which have no effect upon the rate of vulcanization of rubber compositions containing accelerators activated by nitrogenous bases, but only to limit it to such substances as have substantially no effect upon the vulcanization of compositions not containing such accelerators. For example, if one of the condensation products of this invention is incorporated into a non-accelerated, sulphur-containing rubber compositions, a useful vulcanized rubber product is not obtained, even after vulcanizing for an hour at 300° F. Therefore this product is considered substantially a non-accelerator of vulcanization, in spite of the fact that it is capable of almost doubling the rate of vulcanization of a composition containing a sulfur accelerator such as tetramethyl-thiuramdisulfide.

It is to be understood that the term "treating" as employed in the appended claims is used in a generic sense to include either the incorporation of the condensation products of this invention into the rubber by milling or similar process, or to the application thereof to the surface of a mass of crude or vulcanized rubber. The term "rubber" is likewise employed in the claims in a generic sense to include caoutchouc, balata, gutta percha, rubber isomers and like products, whether or not admixed with fillers, pigments, vulcanizing or accelerating agents.

While I have herein disclosed with considerable particularity certain preferred manners of performing my invention, I do not thereby desire or intend to limit myself solely thereto, as hitherto, stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with the condensation product of two or more mols of aldol with one mol of alpha-naphthylamine, prepared in the presence of a small proportion of an acid.

2. An age-resisting rubber composition comprising the condensation product of two or more mols of aldol with one mol of alpha-naphthylamine, prepared in the presence of a small proportion of an acid.

3. The method of preserving rubber which comprises treating rubber with the condensation product of two or more mols of a single aliphatic aldehyde with one mol of a naphthylamine.

4. An age-resisting rubber composition comprising the condensation product of two or more mols of a single aliphatic aldehyde with one mol of a naphthylamine.

5. A vulcanized rubber composition which has been vulcanized in the presence of the condensation product of two or more mols of a single aliphatic aldehyde with one mol of alpha-naphthylamine.

In witness whereof I have hereunto set my hand this 7th day of September, 1928.

CLAYTON W. BEDFORD.